United States Patent [19]

Iida et al.

[11] Patent Number: 4,825,290

[45] Date of Patent: Apr. 25, 1989

[54] CAMERA FOR SHOOTING MOVIE AND STILL IMAGES

[75] Inventors: Toshiharu Iida; Akio Serizawa, both of Tokyo, Japan

[73] Assignees: Fuji Photo Film Co., Ltd., Kanagawa; Sony Corporation, Tokyo, both of Japan

[21] Appl. No.: 133,299

[22] Filed: Dec. 15, 1987

[30] Foreign Application Priority Data

Dec. 16, 1986 [JP] Japan ................. 61-297459

[51] Int. Cl.$^4$ .............................. H04N 7/18
[52] U.S. Cl. ..................... 358/209; 358/229; 354/76
[58] Field of Search ............ 358/909, 229, 209; 354/212, 170, 173.1, 76; 352/137

[56] References Cited

U.S. PATENT DOCUMENTS

| | | | |
|---|---|---|---|
| 4,714,962 | 12/1987 | Levine | 358/909 |
| 4,716,470 | 12/1987 | Levine | 358/229 |
| 4,742,369 | 5/1988 | Ishii et al. | 354/76 |

*Primary Examiner*—Jin F. Ng
*Assistant Examiner*—Stephen Brinich
*Attorney, Agent, or Firm*—Birch, Stewart, Kolasch & Birch

[57] ABSTRACT

A camera includes a video camera unit to shoot a movie image and a still camera unit to shoot a still image so as to permit the movie and still images to be shot at the same time. The still camera unit has a unit to wind up a film, and a driving force is imparted to the windup unit by means of two rotational force impart units respectively having smooth surfaces to contact with each other. Consequently, when a still image is shot while movie image shooting is taking place, noise produced by winding up the film can be minimized.

8 Claims, 8 Drawing Sheets

| Fig. 2a | Fig. 2b | Fig. 2c |

CAMERA FOR SHOOTING MOVIE AND STILL IMAGES

BACKGROUND OF THE INVENTION

1. Field of the Invention

The present invention relates to a camera for shooting movie and still images, and in particular, to a video camera with which still camera using, for example, a silver-halide photographic film is associated.

2. Description of the Prior Art

In order to satisfy a demand for a particular scene to be recorded in the form of a still picture while shooting the scene with a video camera, there has been desired a television camera which functions to record both movie and still images.

Conventionally, for example, a still camera utilizing silver-halide photographic film and a video camera are used in such a manner that, if an object of interest to be shot by the still camera appears while shooting a specific scene with the video camera, the operation of the video camera must be interrupted to record a still image with the still camera. In such a situation, the user must carry two systems for the camerawork; furthermore, the shooting operation of the video camera must be temporarily stopped when the still camera is to be operated, which leads to the disadvantage that a scene desired to be shot may be lost in some cases.

In order to solve these problems, a camera implementing a system in which a still camera and a video camera are combined with each other for shooting movie and still images has been desirable, thereby enabling a still picture to be shot by the still camera without interrupting the operation of the video camera.

In such a camera, a still picture shooting function and a movie picture shooting function are required to be accomplished at the same time. Consequently, complex operations are necessary for the camera to implement the automatic focus and iris operations.

As a consequence, the still camera is desirably provided with automatic winding means for automatically winding a roll of film such that when a still image shooting button is arranged in the proximity of a movie shooting button to shoot a still image, the shooting of the still image and the windup of the film are effected automatically.

In such an operation, when a still image is shot, a sound is produced due to the windup of the film, which causes the sound generated by the film windup operation to be recorded as a noise in the recording of the movie picture.

SUMMARY OF THE INVENTION

It is therefore an object of the present invention to provide a camera capable of simultaneously shooting movie and still images, and preventing the sound caused by the film windup from a still image shot during a movie image shooting operation from being recorded as noise in the recording of the movie images.

According to the present invention, there is provided a camera for shooting movie and still images, a video camera unit including an imaging optical system to shoot an object so as to record signals representative of a motion picture thereof on a magnetic tape, and a still camera unit for shooting the object to record a still picture thereof on a photographic film. The still camera unit comprises winding means for winding the film, driving means for supplying a driving force necessary for the winding means to wind the film, and driving force imparting means for imparting the driving force from the driving means to the winding means. The driving force imparting means includes two rotational force imparting means respectively having smooth surfaces being brought into contact with each other so as to transfer the rotational force through the contact between the smooth surfaces.

In this specification, the term "a camera for shooting movie and still images" is broadly defined as a camera in which a still camera unit and a single video camera unit are contained in a housing or a camera in which the still and video camera units are respectively contained in independent cabinets, namely, regardless of whether the two cabinets are separable and whether the respective units can be independently used if the cabinets are separable, the term should be broadly interpreted to be a shooting apparatus including the functions of a still camera and a video camera.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, a description will be given of embodiments of a camera according to the present invention.

Figure 1A:
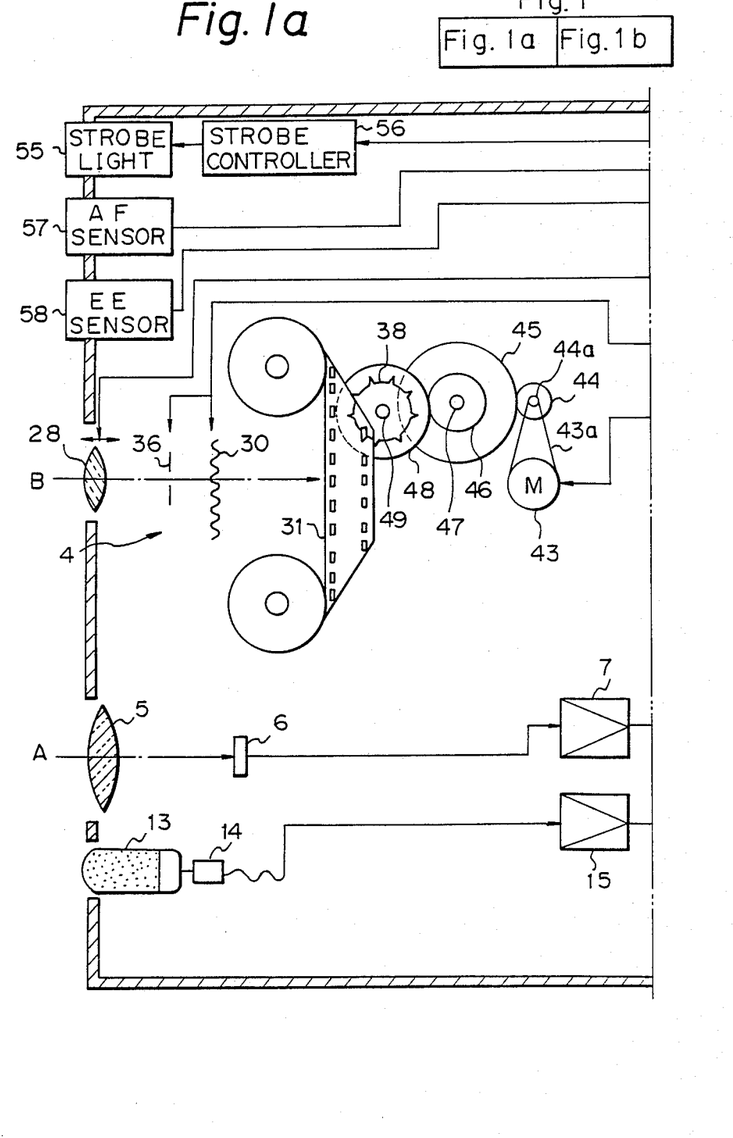
FIGS. 1A–1B, when combined as shown in FIG. 1, are schematic configuration diagrams of an embodiment of a camera for shooting movie and still images according to the present invention.
Figure 1B:
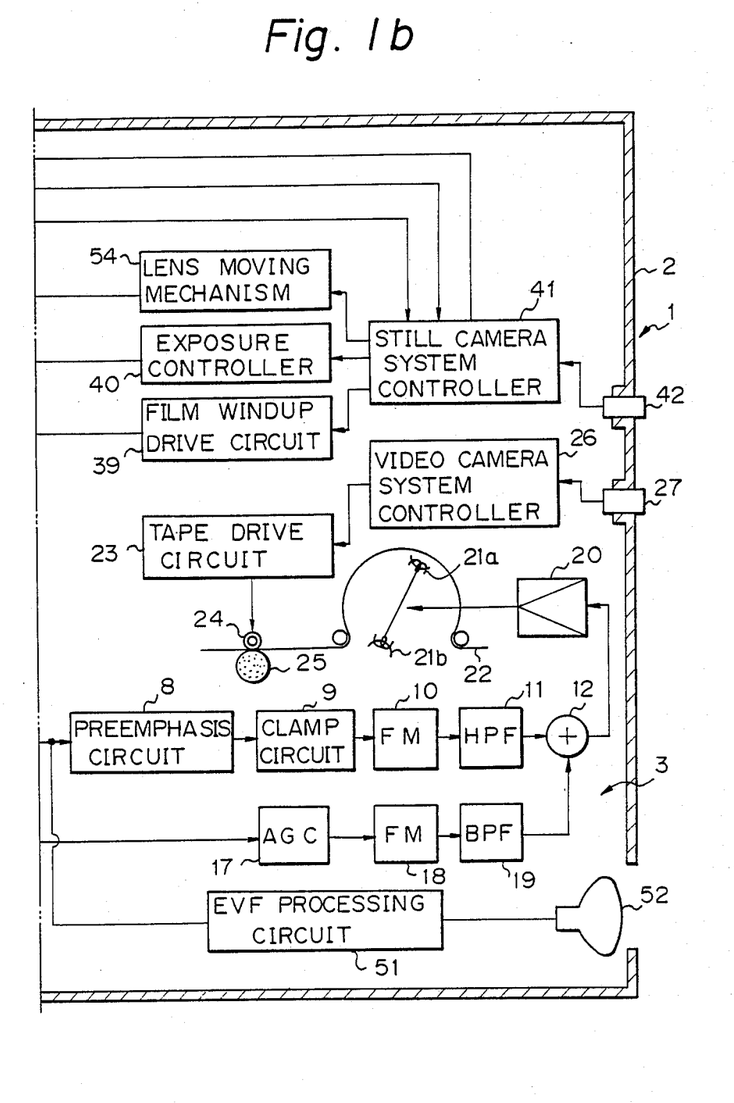

FIGS. 1A–1B show schematic configuration diagrams of an embodiment of a camera for shooting movie and still images according to the present invention.

In these diagrams, a body 2 of a camera 1 contains therein a video camera unit 3 and a still camera unit 4.

The video camera unit 3 performs a movie shooting function in which an 8 millimeter (mm) video tape is used as a video image recording medium to record a moving picture of an object on the video tape in the form of video signals.

The still camera unit 4 performs a still image shooting function of a in which 135-type silver-halide photographic film is used as a still image recording medium. Incidentally, the still camera unit 4 may also use 110-type silver-halide photographic film.

The video camera unit 3 includes an imaging optical system A having a master lens 5 disposed within the body 2 and a charge coupled device (CCD) 6 arranged after the master lens 5 to convert an optical image of an object focused by the master lens 5 into video signals, which are then fed to a circuit system for processing luminance signals.

The circuit system of the luminance signal comprises, as shown in the diagrams, an amplifier 7 to amplify luminance signal components in the video signals from the CCD 6, a preemphasis circuit 8 to emphasize a high-frequency component of a signal output from the amplifier 7, a clamp circuit 9 to retain a constant level of a waveform of signals output from the preemphasis circuit 8, a frequency modulator 10 to convert the luminance signals output from the clamp circuit 9 into recording signals to be recorded on a magnetic tape 22, a high-pass filter (HPF) 11 to remove, from signals outputted from the frequency modulator 10, color signals associated with a lower-band conversion, not shown, and a band of frequencies of audio signals to be described later, and a mixer 12 to multiplex an output signal from the HPF 11 with an audio signal. For the preemphasis circuit 8 and the clamp circuit 9, those included in the recording circuit system of known video tape recorders may be used.

The body 2 is externally provided with a microphone 13 to detect sound, which is then converted into audio signals through a microcapsule 14. The audio signals are sent to a circuit associated with an audio signal recording system.

The circuit of the audio signal recording system includes, as shown in the diagram, an amplifier 15 to amplify audio signals from the microcapsule 14. The amplifier 15 delivers an output to be in turn fed to an automatic gain control (AGC) circuit 17, which automatically adjusts an input level of the audio signals when it is other than a predetermined value. An output from the AGC circuit 17 is delivered to a frequency modulator 18.

The frequency modulator 18 converts the audio signals from the AGC circuit 17 into recording signals to be recorded on the magnetic tape 22. A band-pass filter (BPF) 19 passes only signals falling into a frequency band between the frequency modulated luminance signal and the chrominance signals converted into the lower band from the frequency modulator 10.

The video signals converted into recording signals are mixed with audio signals converted into recording signals in the mixer 12 the mixed signals are sent via a recording amplifier 20 to magnetic heads 21a–21b respectively arranged at different azimuth angles, and the signals are then recorded on the magnetic tape 22 by means of the magnetic heads 21a–21b. The magnetic tape 22 is retained by a capstan 24 driven by a tape drive circuit 23 and a pinch roller 25 so as to be fed in a predetermined direction.

The signals from the amplifier 7 are also supplied to a processing circuit 51 for an electro-viewfinder. The signals output from the processing circuit 51 are fed to a cathode-ray tube (CRT) 52, which serves as a viewfinder to display an optical image of an object, thereby supplying the operator with an image of the object being recorded.

A system controller 26 for the video cmera unit sends predetermined control instruction signals to the tape drive circuit 23. The control instruction signals are output depending on instruction signals from a record (REC) button 27 disposed in a rear surface of the body 2.

The still camera unit 4 has an optical system B including a master lens 28 mounted on the front surface of the body 2. At the rear side of the master lens 28, there is formed an optical path of an image associated with an object and delivered from the master lens 28. An iris 36, a focal plane shutter 30, and a roll film 31 are arranged respectively on the optical path.

The roll film 31 of this embodiment is a 135-type silver-halide film. A sprocket 38 to wind the roll film 31 is connected via a belt 43a and rims 44, 45, 46, and 48 to a motor 43 to receive a driving force from the motor 43 driven by a film windup drive circuit 39. The motor 43 has a rotary shaft connected via belt 43a to a rotary shaft 44a of the rim 44, which is brought into contact with the rim 45. The rim 46 is mounted on a rotary shaft 47 onto which the rim 45 is also fixed. The rim 46 contacts the rim 48, the sprocket 38 being fixedly secured on a rotary shaft 49 of the rim 48. The rims 44, 45, 46, and 48 each are made of rubber such that if two rims are brought into contact with each other and one of the rims rotates, the driving force of the rotation is imparted to the other rim.

Consequently, a sprocket 38 is rotated in the predetermined direction by the driving force of the motor 43 and hence the roll film 31 is wound by a fixed length for each windup operation. These components including the sprocket 38, the rims 44, 45, 46, and 48, the belt 43a, the motor 43, and the film windup drive circuit 39 constitute film windup means.

A still camera system controller 41 transmits predetermined control instruction signals to the film windup drive circuit 39, an exposure controller 40, a lens moving mechanism 54, and a strobe controller 56. The control instruction signals are produced when an instruction signal from the shutter release button 42 disposed on the rear surface of the body 2 is input to the still camera system controller 41.

The still camera unit 4 is provided with an AF (automatic focus) sensor 57 and an EE sensor 58 each exposed with respect to the body 2. The AF sensor 57 and the EE sensor 58 respectively measure a distance between the apparatus and the object, and the brightness of the object to respectively send the measured data to the still camera system controller 41.

The still camera system controller 41 outputs an instruction signal to the lens moving mechanism 54 in response to the data denoting the distance between the apparatus and the object output from the AF sensor 57, so that the lens moving mechanism 54 accordingly adjusts the position of the master lens 28.

The still camera system controller 41 outputs an instruction signal to the exposure controller 40 and the strobe controller 56 in response to the data denoting the brightness of the object fed from the EE sensor 58, and the exposure controller 40 in turn adjusts the opening of the iris 36 and controls the shutter exposure time for which the shutter 30 is kept opened. The strobe controller 56 controls the light emission of a strobe 55.

The camera of the embodiment has the configuration described above.

Next, a description will be given of the operation of the camera.

When the operator pushes the REC button 27, the video camera system controller 26 sends a predetermined control instruction signal to the tape drive circuit 23, which then drives the capstan 24 and the pinch roller 25 so as to feed the magnetic tape 22. As such an operation begins, video signals obtained by shooting an object through the CCD 6 are converted into recording signals by the frequency modulator 10 through the amplifier 7, the preemphasis circuit 8 and the clamp circuit 9 so as to be fed via the HPF 11 to the mixer 12. On the other hand, audio signals attained from the microcapsule 14 of the microphone 13 are delivered via the amplifier 15 and the AGC circuit 17 to the frequency modulator 18, which converts the received audio signals into recording signals to be supplied via the BPF 19 to the mixer 12. The signals resulting from the mixing operation of the video signals and the audio signals in the mixer 12 are sent via the recording amplifier 20 to the magnetic head 21a, which records the received signals on the magnetic tape 22.

When a still image is to be shot during the movie image shooting operation described above, the operator may push the shutter release button 42. The still camera system controller 41 then sends a predetermined instruction signal to the lens moving mechanism 54 and the exposure controller 40 in response to the data sent from the AF sensor 57 and the EE sensor 58 so as to adjust the position of the master lens 28, set the opening of the shutter iris 36, the exposure time of the shutter 30, and to open and then to close the shutter 30. If necessary, the still camera system controller 41 supplies an instruction signal to the strobe controller 56 to cause the light emission of the strobe 55.

After the opening and closing of the shutter 30, the still camera system controller 41 outputs a control instruction signal to the film windup drive circuit 39, which in turn drives the motor 43 into rotation. The rotation of the motor 43 causes the rim 44 to turn by means of the belt 43a, the rim 45 contacted with the rim 44 is turned, and the rim 46 is rotated by means of the rotary shaft 47 of the rim 45. Furthermore, the rim 48 contacting the rim 46 is turned, the sprocket 38 is then rotated via the rotation shaft 49 of the rim 48, and as a result a length of the roll film 31 corresponding to one frame is wound up.

According to the present embodiment, as described above, since the video camera unit 3 and the still camera unit 4 are arranged in the body 2 comprising a housing, a movie image as well as a still image can be shot by a single apparatus. Furthermore, the movie and still image operations can be effected by means of the REC button 27 and the shutter release button 42 disposed on the body 2, and since the REC button 27 is located in the vicinity of the shutter release button 42, the operator can easily achieve shooting both movie and still images. In this embodiment, although the REC button 27 and the shutter release button 42 are arranged on the rear surface of the body 2, it is also desirble to dispose the REC button 27 and the shutter release button 42 adjacent each other at locations of fingers of an operation grip, (not shown) for example, in the bottom surface of the body 2.

Since this apparatus is provided with automatic film windup means, the operator need only push the REC button 27 and the shutter release button 42 to shoot movie and still images without having to also wind up the film 31.

Moreover, since the driving force of the motor 43 is imparted to the belt 43a, the rims 44, 45, 46, and 48, and the sprocket 38, the noise produced when the film 31 is wound up is reduced. As a consequence, in a case where a still picture is shot during a movie picture shooting operation, the noise usually associated with the windup operation of no film 31 is rarely produced, and hence the substantial windup noise is recorded on the magnetic tape 22, which enables a satisfactory recording of the movie image thus shot.

Figure 2:
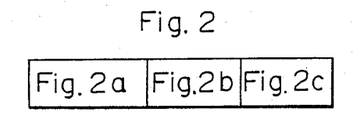
FIGS. 2A–2C, when combined as shown in FIG. 2, are schematic configuration diagrams of an alternative embodiment of a camera for shooting movie and still images according to the present invention.
Figure 2A:
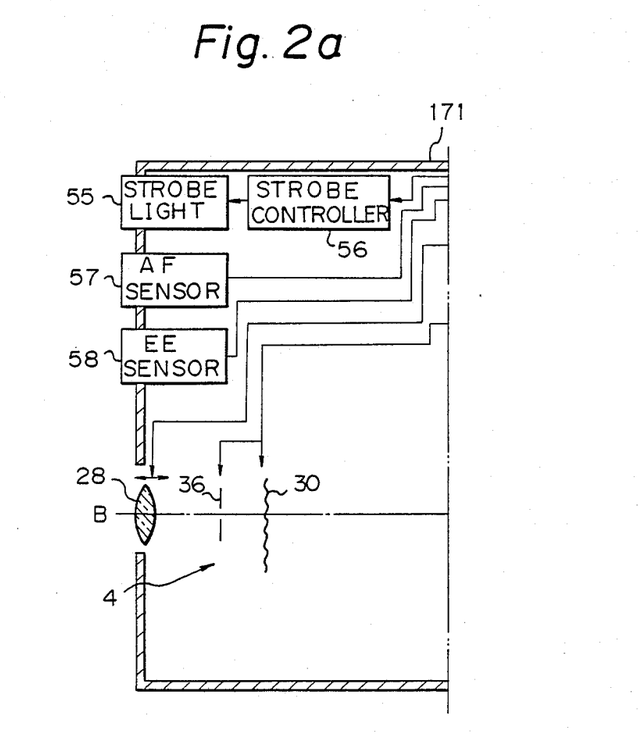
Figure 2B:
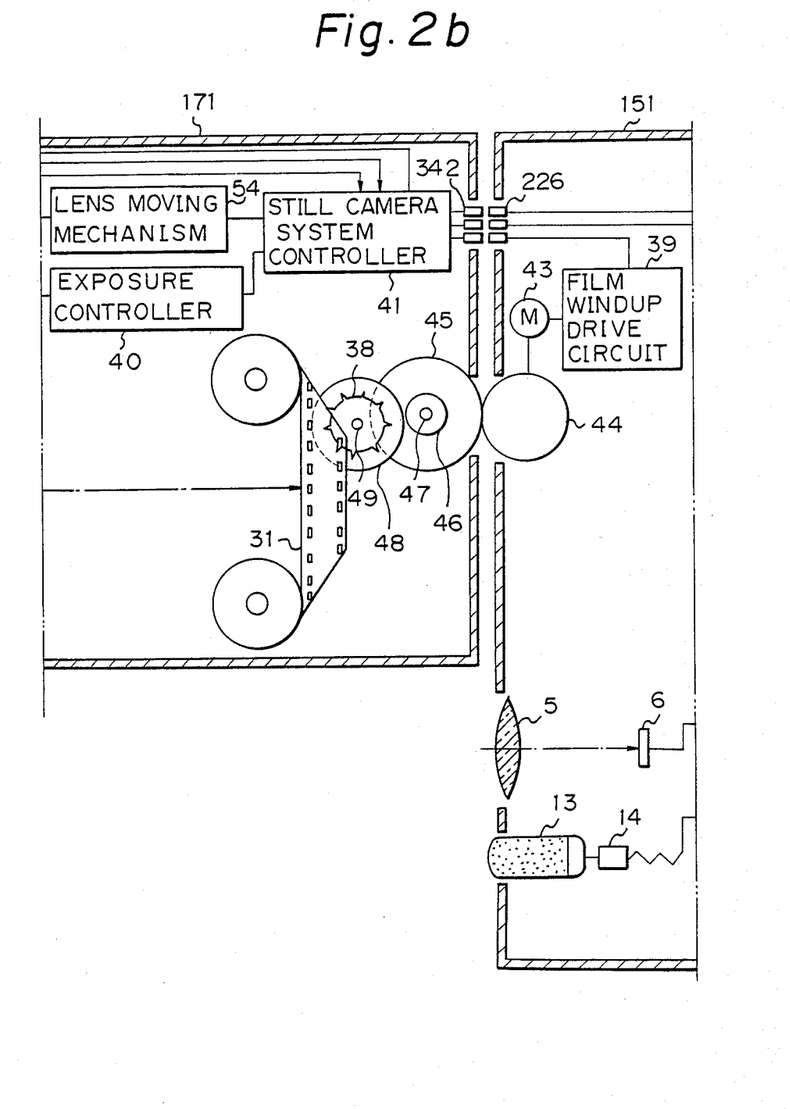
Figure 2C:
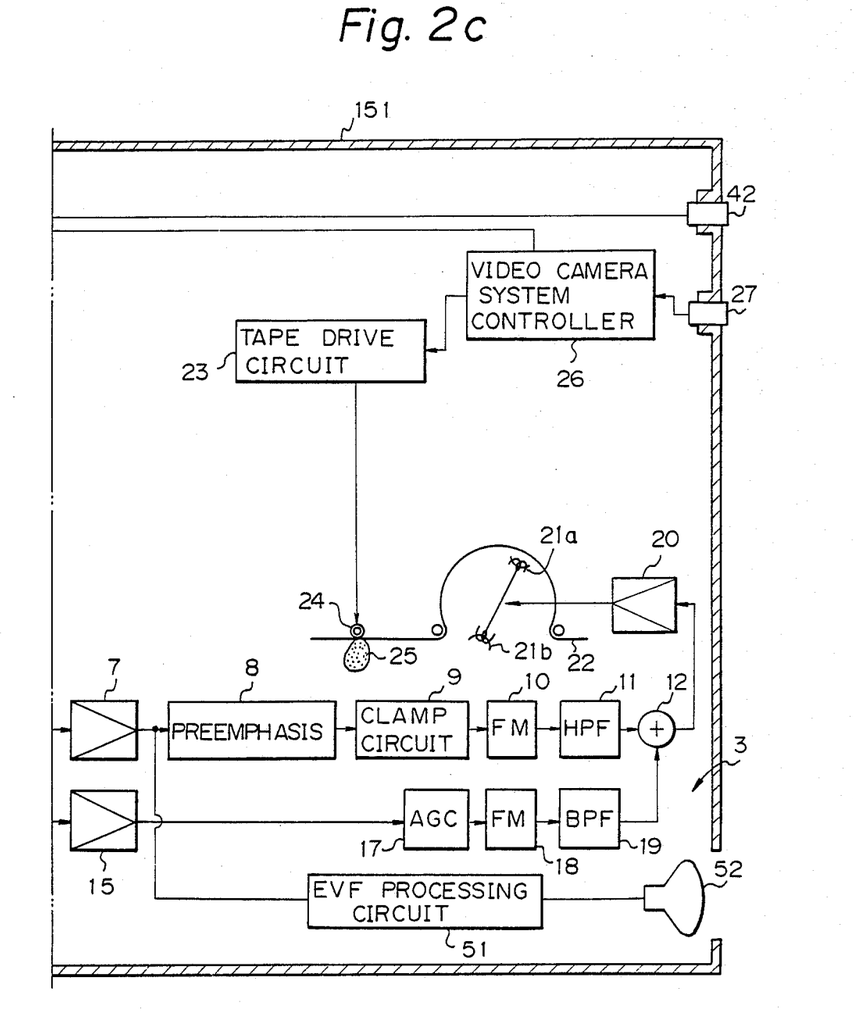

FIGS. 2A–2C are schematic configuration diagrams of an alternative embodiment of a camera according to the present invention.

In this embodiment, a video camera unit 3 and a still camera unit 4 are contained in separate cabinets, which are detachably mounted in the apparatus. The cabinet of the still camera unit 4 contains a master lens 28, an iris 36, shutter 30, a film 31, a sprocket 38, and rims 48, 46, and 45. A portion of the rim 45 projects from the cabinet and is brought into contact with a rim 44 which partially projects from the cabinet of the video camera unit 3 to impart a rotary driving force to rim 45.

The cabinet of the still camera unit 4 contains a strobe 55, a strobe controller 56, an AF sensor 57, an EE sensor 58, a still camera system controller 41, a lens moving mechanism 54, and an exposure controller 40. A film windup drive circuit 39, a motor 43, and a rim 44 to be used in the shooting of a still image are housed in the cabinet of the video camera unit 3. A portion of the rim 44 projects from the cabinet and contacts with the rim 45.

A signal from the shutter release button 42 to the still camera system controller 41 and a signal from the still camera system controller 41 to the film windup drive circuit 39 are transmitted via electric connectors 226 and 342 respectively disposed in the video camera unit 3 and the still camera unit 4. The still camera system controller 41 is also connected via the electric connectors 226 and 342 to the video camera system controller 26.

The functional components for shooting a movie image are entirely housed in the cabinet of the video camera unit 3.

The rest of the configuration shown in FIGS. 2B–2C is the same as that of the camera shown in FIGS. 1A–1B.

Figure 3:
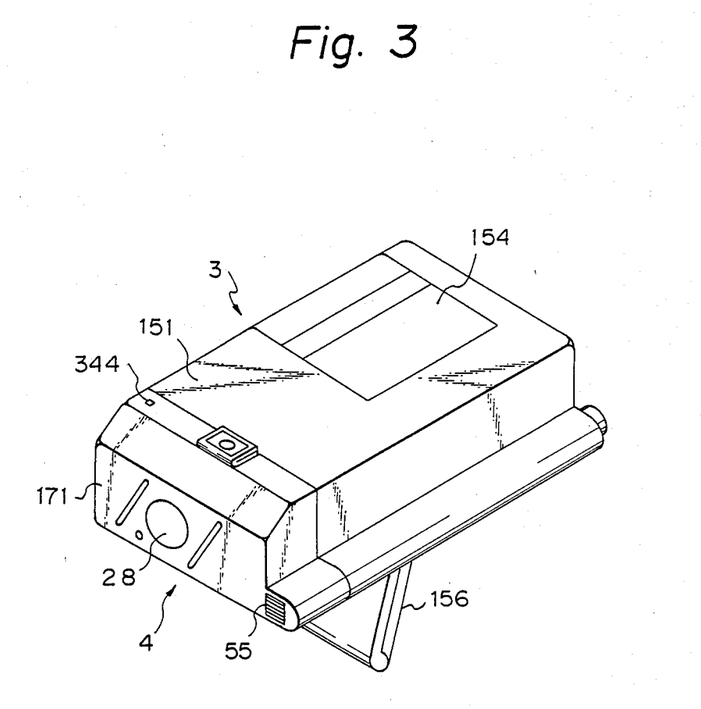
FIG. 3 is a perspective view schematically showing the apparatus of FIGS. 2A–2C in a nonoperative state.

FIG. 3 shows an appearance of the apparatus of FIGS. 2A–2C.

In this embodiment, as shown in the diagram, the video camera unit 3 and the still camera unit 4 of the apparatus are respectively housed in the separate cabinets.

The video camera unit 3 has a body 151 generally in the shape of a parallelepiped as shown in FIG. 3. In this embodiment, the still camera unit 4 is detachably mounted on a front surface 160, FIG. 4, of the body 151.

Figure 5:
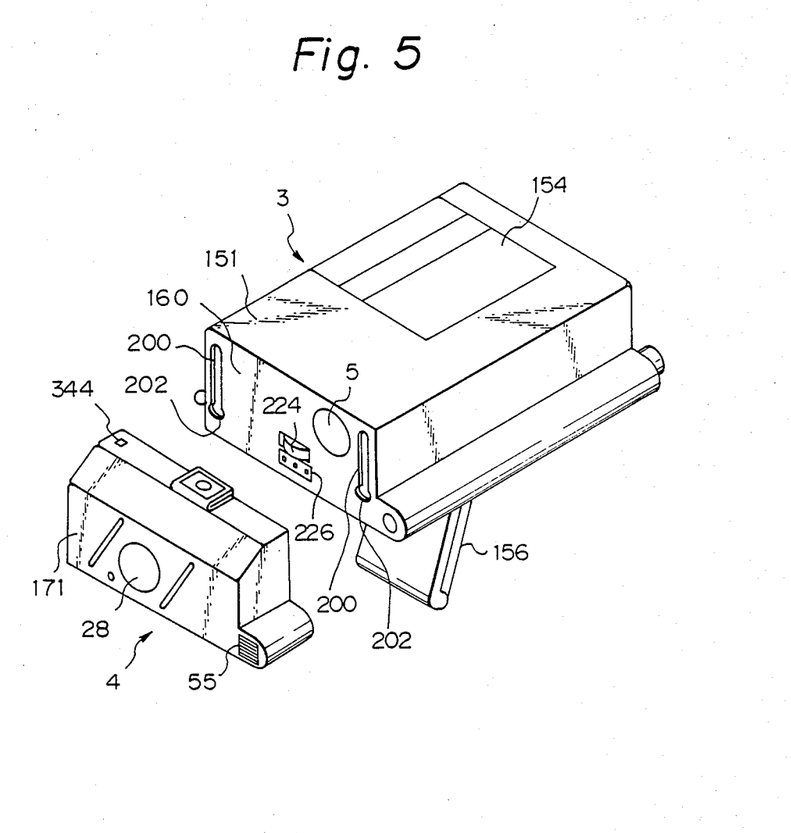
FIG. 5 is a perspective view schematically showing a state in which the apparatus of FIG. 3 is separated into two units.

The video camera unit 3, as shown in FIG. 5, has an optical opening or a lens 5 of an imaging optical system disposed in the front surface 160 of the body 151, which has a housing 154 for detachably mounting therein an 8-mm video tape cassette. Furthermore, on the bottom surface of the body 151 of the video camera unit 3, there is mounted a hand grip 156.

The still camera unit 4 also has a body 171 generally shaped substantially in a parallelepiped. As shown in the diagram, the body 171 is mounted on the front surface 160 of the body 151 such that a flat front surface thereof matches with the front surface 160 of the body 151 of the video camera unit 3. As can be seen from FIG. 5 in which the still camera unit 4 and the video camera unit 3 are separated from each other, two slots 200 are formed in the front surface of the body 151 of the video camera unit 3. These slots 200 respectively have openings 202 at the lower ends thereof, each being of circular shape such that two projections, not shown, complementarily disposed on the rear surface of the body 171 of the still camera unit 4 are detachably engaged therewith.

As a result, a detachable mount function is provided to detachably mount the still camera unit 4 on the video camera unit 3. The video camera unit 3 is selectively retained in an idle state as shown in FIG. 3 where the video camera unit 3 is not used and in an operative state as shown in FIG. 4 where the video camera unit 3 is operable.

In the idle state of the video camera unit 3 of FIG. 3, the body 171 of the still camera unit 4 completely covers the front surface 160 of the body 151 of the video camera unit 3 so as to protect the imaging optical system including the lens 5 from being damaged.

Figure 4:
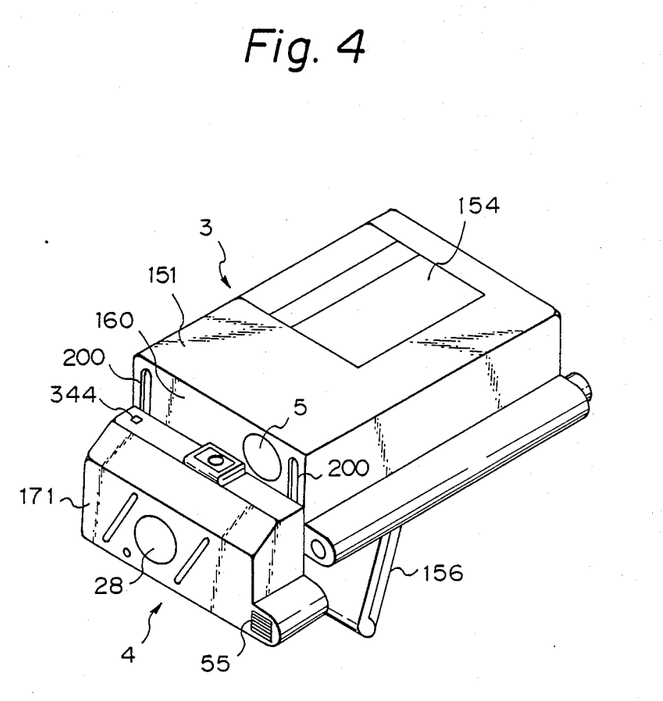
FIG. 4 is a perspective view schematically showing the apparatus of FIGS. 2A–2C in an operative state.

In the operative state of FIG. 4, the lens 5 of the video camera unit 3 is exposed to the external environment, which enables the video camera unit 3 to shoot movie images. The still camera unit 4 is provided with a shutter release button 344 as shown in FIG. 4. The shutter release button 344 is used when a still image is to be shot with the still camera unit 4 separated from the video camera 3.

On the front surface 160 of the video camera unit 3, as shown in FIG. 5, there is disposed an electric connector 226. Although not shown in FIG. 5, on the rear surface of the still camera unit 4, there is disposed an electric connector 228 at a position corresponding to the position of the connector 226 of the video camera unit 3 so as to engage with the connector 226. The connectors 226 and 228 are connecting devices to establish electric connections between the still camera unit 4 and the video camera unit 3 in the operative state.

As described above, in this embodiment, the still camera unit 4 is movably mounted on the front surface 160 of the parallelepiped body 151 of the video camera unit 3, where the lens 5 is disposed. In the idle state, the still camera unit 4 can be mounted on the video camera unit 3 so as to for a unitary shape. When the video camera unit 3 is to be operated, the still camera unit 4 is moved on the front surface 160 of the video camera unit 3 so that the lens 5 of the video camera unit 3 is exposed to the external environment.

Consequently, also in the apparatus of FIGS. 2A–2C, the lens 5 is externally exposed in the operative state.

Referring now to FIGS. 2A–2C, a description will be given of the operation of the apparatus. The operation for shooting a movie image is the same as that of the embodiment of FIGS. 1A–1B.

In shooting a still picture, when the operator depresses the shutter release button 42 located in the video camera unit 3, the signal from the shuttle release button 42 is fed via the electric connectors 226 and 342 to the still camera system controller 41. This causes an instruction signal output from the still camera system controller 41 to be supplied via the electric connectors 226 and 342 to the film windup drive circuit 39, which drives the motor 43, and consequently the rim 44 is rotated. The rotation of the rim 44 is imparted to the rim 45 contacted therewith to thereby wind the film 31 in a similar fashion as that of the camera of FIGS. 1A–1B.

In the camera of FIGS. 2A–2C, the video camera unit 3 and the still camera unit 4 are respectively housed in separate cabinets. Since the motor 43 supplying the driving force to automatically wind the film 31 is contained in the cabinet of the video camera unit 3, the power supply for the motor 43 need only be disposed in the video camera unit 3, namely, the cabinet of the still camera unit 4 does not require a power supply.

The driving force supplied from the motor 43 to wind the film 31 is transferred via the rims 44, 45, 46, and 48 to the sprocket 38. Consequently, in a case where a still image is shot during a movie image shooting operation, no windup noise of the film 31 is recorded in the movie shooting operation, and hence a satisfactory movie image with sound recording can be obtained.

In this embodiment, the video camera unit 3 and the still camera unit 4 are housed in the apparatus in a shape particularly suitable for carrying the apparatus in the idle state in which the lens 5 of the video camera unit 3 is protected. Also in this embodiment, the still camera unit 4 can be separated from the video camera unit 3 so as to be respectively utilized as an individual unit.

In the embodiment above, although silver-halide photographic film is used in the still camera unit 4, the still camera unit 4 may by any type of still camera such as an instant photograph or an electronic still camera in which video signals are recorded on a magnetic disk.

According to the present invention, since the still camera unit possesses means for automatically winding a film roll, operations to shoot movie and still images can be simultaneously and easily effected. Moreover, since the automatic windup means includes driving force imparting means having smooth contact surfaces to impart the driving force through a contact between the smooth surfaces, the windup noise produced when the film is wound up is reduced; consequently, even when a still image is shot while movie image shooting is taking place, no windup noise of the film is recorded in the movie image shooting operation, which will result in a satisfactory movie image recording.

While the present invention has been described with reference to the particular illustrative embodiments, it is not restricted by those embodiments but only by the appended claims. It is to be appreciated that those skilled in the art can change or modify the embodiments without departing from the scope and spirit of the present invention.

What is claimed is:

1. A camera for shooting movie and still images comprising:
   a video camera unit including an imaging optical system for imaging an object, said imaging optical system outputting signals representative of a movie image of the object which are recorded on a magnetic tape; and
   a still camera unit for recording a still image of said object on a photographic film, said still camera unit including,
   windup means for winding up the film,
   motor drive means for supplying a driving force causing said windup means to wind up the film and
   driving force imparting means for imparting the driving force from said motor drive means to said windup means,
   said driving force imparting means including at least two rotational force imparting members each having smooth surfaces contacting each other so as to impart a rotational force to said winding means through a contact between said smooth surfaces.

2. A camera in accordance with claim 1, wherein said video camera unit and said still camera unit are arranged in a unitary housing.

3. A camera in accordance with claim 1, wherein said video camera unit and said still camera unit are respectively arranged in independent cabinets,
   said still camera unit cabinet being detachably mounted on said video camera unit cabinet.

4. A camera in accordance with claim 3, wherein said motor drive means is disposed in said video camera unit cabinet.

5. A camera in accordance with claim 1, wherein said driving force imparting means includes a plurality of rims having smooth surfaces, the surfaces of adjacent rims contacting each other to impart said rotational force therebetween.

6. A camera in accordance with claim 1, wherein said driving force imparting means includes a plurality of pulleys and a belt applied to said pulley, said belt also connected to said motor drive means to impart said driving force to said pulleys therefrom.

7. A camera for shooting both movie and still images of an object simultaneously, comprising:
   a video camera unit for recording said movie images and associated soundtrack on a magnetic recording medium; and
   a still camera unit for recording said still images on a photographic recording medium, said still camera unit including,
      advance means for advancing said photographic medium upon the recording of a still image thereon,
      motor drive means for supplying a driving force to drive said advance means, and
      driving force imparting means for imparting said driving force from said motor drive means to said advance means;
   said driving force imparting means including at least two rotational members having smooth surfaces contacting each other so as to impart said driving force from said motor drive means to said advance means with a minimum of noise, thereby enabling said still images to be recorded during the recording of said movie images and associated soundtrack without introducing undesired noise onto said soundtrack.

8. The camera defined in claim 7, wherein said photographic recording medium comprises silver-halide film.

* * * * *